(12) United States Patent
Keller et al.

(10) Patent No.: US 7,321,609 B1
(45) Date of Patent: Jan. 22, 2008

(54) SYSTEM AND METHOD FOR DETECTING PN CODE PHASE

(76) Inventors: Merle L. Keller, 575 Morton Dr., Salt Lake City, UT (US) 84116; Dale D. Fonnesbeck, 138 W. 400 S., Kaysville, UT (US) 84037; Kenneth C. Bark, 3146 W. 7720 South, West Jordan, UT (US) 84084; Randal R. Sylvester, 3948 South Contadora Cir., West Valley, UT (US) 84128

( * ) Notice: Subject to any disclaimer, the term of this patent is extended or adjusted under 35 U.S.C. 154(b) by 799 days.

(21) Appl. No.: 10/675,185

(22) Filed: Sep. 30, 2003

(51) Int. Cl.
*H04B 1/69* (2006.01)
(52) U.S. Cl. .................................. 375/147; 375/130
(58) Field of Classification Search ............. 375/147, 375/132, 133–137, 130; 380/44, 46, 47; 708/250, 200
See application file for complete search history.

(56) References Cited

U.S. PATENT DOCUMENTS 5,361,276 A * 11/1994 Subramanian .............. 375/150
6,611,512 B1 * 8/2003 Burns ......................... 370/342
7,065,127 B2 * 6/2006 Keller et al. ................ 375/140
2004/0047401 A1 * 3/2004 Keller et al. ................ 375/147

* cited by examiner

*Primary Examiner*—Khai Tran

(57) ABSTRACT

A system for verifying composite pseudo-noise (PN) encoded signals. The system provides at least three PN component codes, wherein the at least three PN component codes are relatively prime. The system partially correlates a received PN composite encoded signal with a first minor epoch derived from the at least three PN component codes. The system searches for phase alignment of the received PN composite encoded signal with a second minor epoch derived from the at least three PN component codes. The system correlates the received PN composite encoded signal with a receiver PN composite code phase when the first minor epoch and the searched second minor epoch are separated by a predetermined phase.

20 Claims, 7 Drawing Sheets

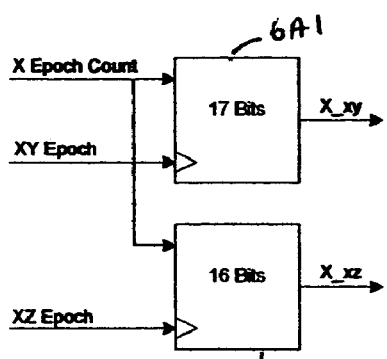
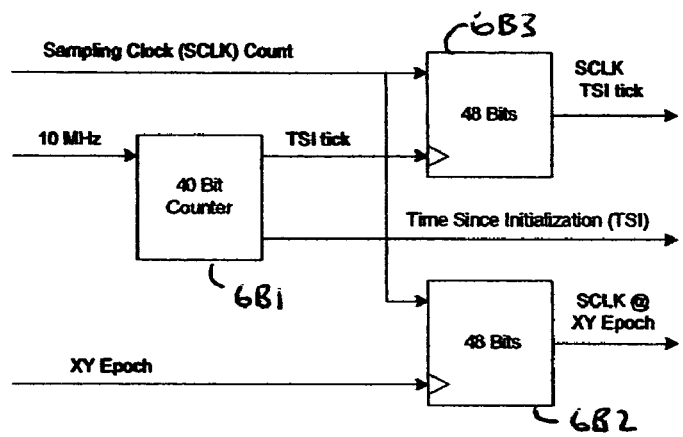
XY and XZ-latched X-epoch Counters
TSI, TSI-tick latched SCLK, and XY-epoch latched SCLK
FIGURE 6A
FIGURE 6B

SYSTEM AND METHOD FOR DETECTING PN CODE PHASE

CROSS-REFERENCE TO RELATED APPLICATIONS

This application is related to copending Non-provisional U.S. patent application Ser. No. 10/058,669 filed Jan. 28, 2002 The disclosure of this Non-provisional Patent Application is incorporated by reference herein in its entirety to the extent it does not conflict with the teachings presented herein.

This application is related to copending Non-provisional U.S. patent application Ser. No. 10/242,146 filed Sep. 11, 2002. The disclosure of this Non-provisional Patent Application is incorporated by reference herein in its entirety to the extent it does not conflict with the teachings presented herein.

BACKGROUND OF THE INVENTION

1. Field of the Invention

The present invention relates to spread spectrum (SS) communication systems using Pseudo-Noise (PN) coding techniques and, more particularly, to detecting PN code phase in code division communications systems.

2. Prior Art

Spread spectrum (SS) systems, which may be Code Division Multiple Access (CDMA) systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of $2n$ frequency positions. The receiver follows the same frequency hop pattern. FHSS systems are also well known in the art and need not be discussed further.

In general, although the original data stream is recovered, after PN acquisition, the actual data cannot be recovered, or extracted from the data stream until data-symbol boundaries are identified. Data-symbol boundaries are identified either with a symbol synchronizer (bit synchronizer, with its attendant acquisition and pull-in time), or with PN code epochs (i.e., PN code phase).

A DSSS communication element requires its locally generated PN code to substantially match the intended, or received, composite code phase as indicated by counters and registers. Communication elements can be stranded if their locally generated PN code really does not match the intended phase. A communication element typically responds to a suspected wrong PN composite code phase condition by resetting the PN composite code, which results in a known starting phase. However, as communication networks become more complex, a PN reset becomes more disruptive.

However, PN code phase is unknowable a priori in the prior art; PN code phase is generally assumed. With prior art, a communication network that is successfully communicating with other communication elements but is unable to draw other communication elements into the network due to a PN code phase error is potentially unaware of stranded, would-be communication elements. It is therefore desirable to provide PN code phase in near-real time and effect system corrections that are transparent to communication elements without disrupting ongoing communications.

SUMMARY OF THE INVENTION

The foregoing and other problems are overcome, and other advantages are realized, in accordance with the presently preferred embodiments of these teachings.

In accordance with one embodiment of the present invention a system is provided. The system includes a receiver for acquiring composite pseudo-noise (PN) encoded signals, the receiver contains a receiver demodulator; a first receiver clock generator, and at least three first receiver pseudo-noise (PN) component code generators coupled to the first receiver clock generator. The receiver also includes a receiver logic combiner coupled to the at least three first receiver PN component code generators, and is adapted to generate a local epoch symmetrical composite PN code. The local epoch symmetrical composite PN code is amalgamated from at least three PN component codes, wherein the at least three PN component codes are relatively prime.

The invention is also directed towards a method for determining Pseudo-Noise (PN) composite phase. The method includes providing at least three relatively prime PN component codes. The method also includes partially correlating a received PN composite encoded signal with a first minor epoch and searching for phase alignment of the received PN composite encoded signal with a second minor epoch. The method correlates the received PN composite encoded signal with a receiver PN composite code phase when the first minor epoch and the second minor epoch are separated by a predetermined phase.

In accordance with another embodiment of the present invention an integrated circuit (IC) is provided. The IC includes at least three receiver pseudo-noise (PN) component code generators $PN_x$, $PN_y$, $PN_z$, wherein each PN component code generator is adapted to generate relatively prime PN component codes when compared with each of the other PN component code generators. The IC also includes a Normalized Epoch Autonomous Phase Number (NEAP) generator for generating at least one NEAP.

The invention is also directed towards a program storage device readable by a machine, tangibly embodying a program of instructions executable by the machine to perform a method for determining Pseudo-Noise (PN) composite phase. The method includes providing at least three relatively prime PN component codes. The method includes partially correlating a received PN composite encoded signal with a first minor epoch derived from the three relatively prime PN component codes, and searching for phase alignment of the received PN composite encoded signal with a second minor epoch derived from the at least three relatively prime PN component codes. The method correlates the received PN composite encoded signal with a receiver PN composite code phase when the first minor epoch and the second minor epoch are separated by a predetermined phase.

BRIEF DESCRIPTION OF THE DRAWINGS

The foregoing aspects and other features of the present invention are explained in the following description, taken in connection with the accompanying drawings, wherein:

FIG. 3 illustrates Y and Z epochs having exploitable identical XY-XZ relationships when the PN composite code is constructed in accordance with teachings of the present invention;

FIG. 4 illustrates scaling by Lx, where XY and XZ epochs have X-epoch separations identical to those shown in FIG. 1;

FIGS. 6A and 6B are block diagrams illustrating Counters and Latches, respectively for capturing NEAP data in accordance with the present invention;

DETAILED DESCRIPTION

As disclosed herein, the present describes a novel method and system for determining PN phase in a spread spectrum communications system.

Figure 8:
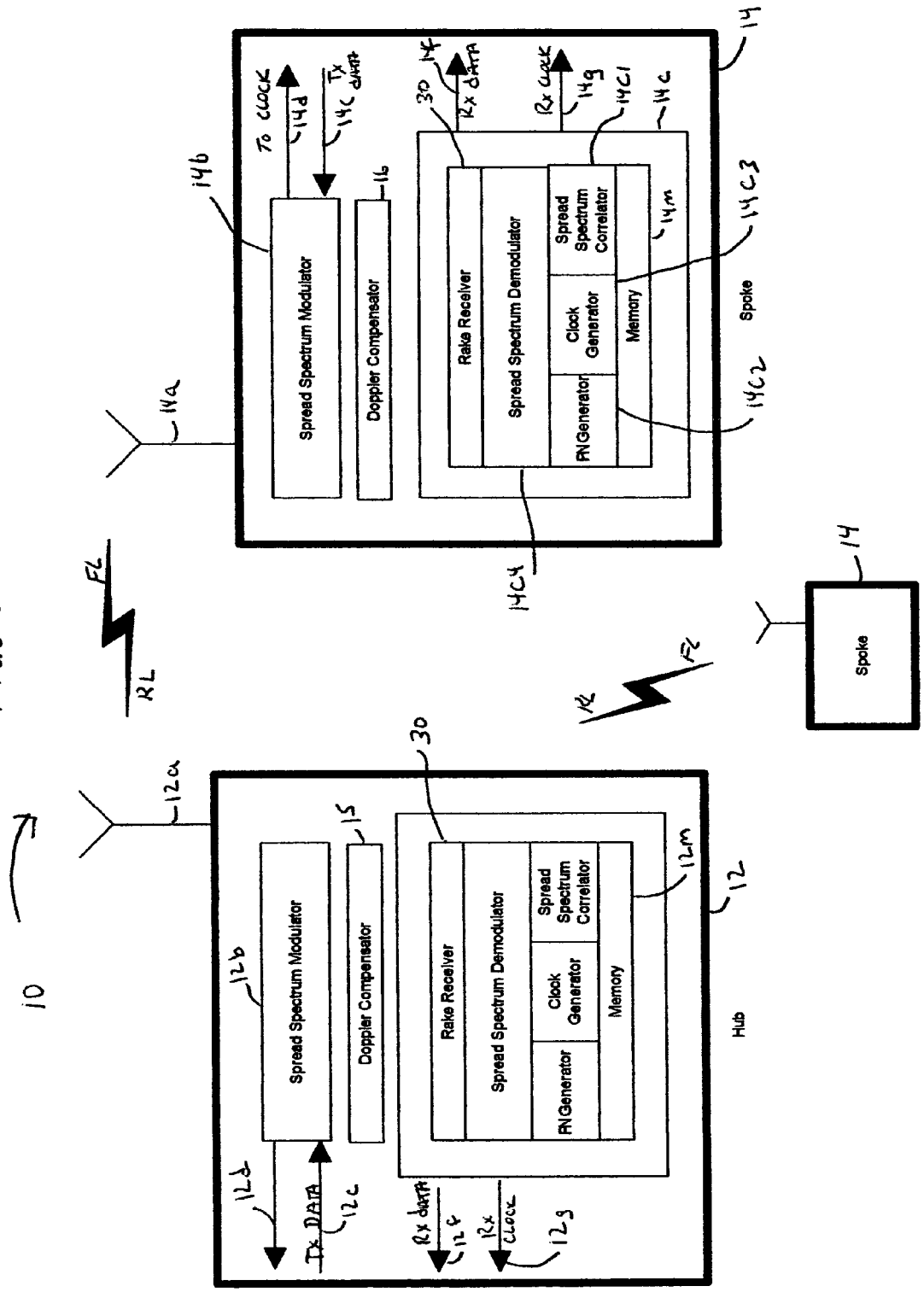
FIG. 8 is a pictorial diagram of a hybrid TDMA-SS system incorporating features of the present invention.

Referring to FIG. 8, there is shown a pictorial diagram of a telecommunication system incorporating features of the present invention. Although the present invention will be described with reference to the embodiment shown in the drawings, it should be understood that the present invention might be embodied in many alternate forms of embodiments, e.g., point-to-point duplex links or point-to-multipoint links. In addition, it should be understood that the teachings herein may apply to any group or assembly of hybrid TDMA-SS receivers, including those that are fixed in place; vehicle mounted; and/or hand carried. As will be made clear, the invention includes waveform structure, link maintenance, and rapid acquisition.

Still referring to FIG. 8, there is shown a full-duplex system 10 that is suitable for practicing this invention. Specifically, the system 10 employs direct sequence spread spectrum based techniques over an air link to provide data transfer between HUB 12 and a SPOKE 14. It will be appreciated that there may be more than one Spoke. The forward link (FL) from HUB 12 to SPOKE 14 contains a spread spectrum waveform that is constructed in the manner described herein, with the PN code being composed of relatively prime even-length and/or maximal length codes. In a similar manner, the return link (RL) from SPOKE 14 to HUB 12 contains a spread spectrum waveform that is similar, or identical, to that of the FL.

Still referring to FIG. 8, HUB 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL is received by SPOKE 14 via antenna 14a. Spoke 14 includes a spread spectrum correlator 14c1, PN generator 14c2, clock generator 14c3, and spread spectrum demodulator (SSD) 14c4. The received signal is then demodulated by SSD 14c4 and PN phase is maintained in accordance with features of the present invention described herein. It will be appreciated that all or partial demodulation functions may be contained within an integrated circuit (IC) such as a Field Programmable Gate Array (FPGA). Once the signal is acquired and the SPOKE 14 is tracking the received signal, the Rx Clock 14g and Rx Data 14f are output to the intended receiver circuitry. It will be appreciated that the clocks 14g and 12d are synchronous and may be commanded to change frequency to correspond with PN code epochs as will be described herein; thus advantageously providing means to vary the data rate without interruption; and without the need for conventional bit synchronizers with associated synchronization time.

Similarly, SPOKE 14 generates a Tx Clock 14d and Tx Data 14e using the Spread Spectrum Modulator 14b in a similar fashion described earlier for a HUB. Likewise, HUB 12 may receive the RL signal via antenna 12a, and demodulate and track the signal as described earlier with receiver 12c to provide Rx Data 12f and Rx Clock 12g to the intended user.

Figure 1:
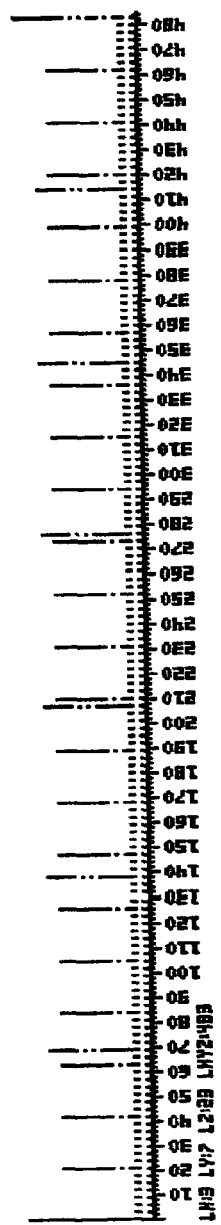
FIG. 1 is a graphic illustration of a 3-7-23 PN code constructed in accordance with teachings of the present invention.

Referring also to FIG. 1, a Direct Sequence Spread Spectrum (DSSS) PN (pseudo noise) code, constructed of relatively prime component codes in accordance with the teachings of the present invention, repeats itself only once per major epoch (convention typically acknowledges the all 1's state of all component codes as the composite code's major epoch). It will be appreciated that longer PN codes (on the order of weeks, years, and decades) and composite PN code phase manipulations are more complex (Smart, data-aided acquisition; GPS-aided acquisition; track-code acquisition; et cetera), and require near-real-time confirmation of PN composite code phase.

RELATIVE PRIMENESS

Relatively prime component codes constructed in accordance with features of the present invention do not share multiplicands of their code lengths. As an example, a PN code may be comprised of three component codes: X, Y, and Z. The length of X is 12 chips (2×2×3 are the multiplicands of 12). The length of Y is 315 chips (5×7×9), and the length of the Z component codes is 601, a prime number. Although the component code lengths of 12 and 315 are not prime, they are relatively prime in that they do not share multiplicands. It will be appreciated that any suitable number of relatively prime component codes may be used.

XX AND XZ EPOCH SEPARATION

Figure 2:
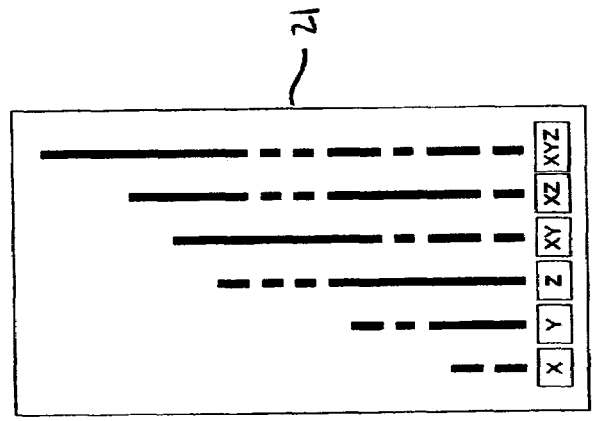
FIG. 2 is an epoch graphic legend illustrating the epochs shown in FIG. 1.

In accordance with features of the present invention, PN composite code phase is determined by XY and XZ epoch separation, independent of order of arrival, and relative (X-epoch) separation, independent of XY/XZ epoch contiguousness. Referring still to FIG. 1 and also FIG. 2, the PN code depicted in FIG. 1 is representative of relatively prime codes. The X, Y, and Z component codes lengths are 3, 7, and 23, respectively. X, XY, XZ, and XYZ epochs are depicted according to the legend shown in FIG. 2. Still referring to FIG. 1, a unique event occurs at chip 210: an XY epoch follows an XZ epoch by a single X epoch. It will be appreciated that this positional relationship and 1 X-epoch separation occurs nowhere else within this PN code sequence constructed in accordance with the teachings of the present invention. At chips 273 and 276, another XY-XZ separation of a single X epoch is again found, but in this case, the XZ follows the XY epoch by one X epoch. At the $10^{th}$ XY-epoch ($N_{xy}$) number of chips ($10 \times 7 \times 3 = 210$ chips), XY epochs have a phase of zero chips and XZ epochs have a phase of 3 chips, which is 1 X epoch. Once the position of XZ/XY-separated-by-one-X-epoch is discovered as described herein, then everything about the PN code is known relative to PN code phase.

DETERMINING THE XZ-XY COMPOSITE CODE PHASE POSITION

The phase position at which an XZ epoch precedes an XY epoch by one X epoch is determined as described herein. The search is performed using modulo arithmetic, as shown in Equation 1. The $N_{xy}$ epoch is discovered by incrementing $N_{zy}$ of Equation 1. Equation 1 searches the PN code at XY epoch number of chips to see if this XY epoch number of chips is an XZ number of chips plus one X epoch.

$$(N_{XY} \times L_X \times L_Y) MOD (L_X \times L_Z) = L_X \quad \text{Equation 1}$$

It can be seen that the length of the X code, $L_z$, is found in all three terms of Equation 1. By eliminating this term from Equation 1, a simplification results and smaller numbers can be used, as shown in Equation 2. This improvement is significant when long code lengths are involved and very large numbers must be handled.

$$(N_{XY} \times L_Y) MOD (L_Z) = 1 \quad \text{Equation 2}$$

Figure 3:
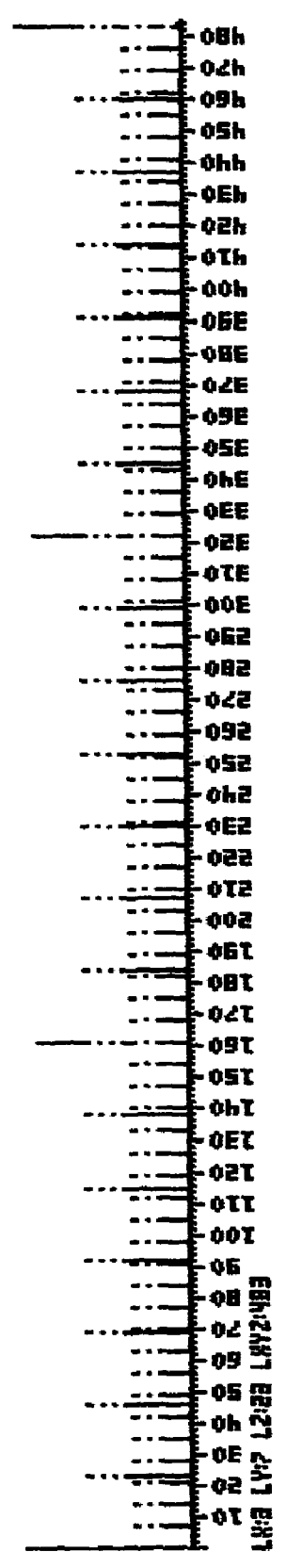

Referring to Equation 2 and FIG. 3, it can be seen in FIG. 3 at chip 70, the $10^{th}$ Y epoch, that a Z epoch occurs at chip 69. In other words, at the $10^{th}$ Y-epoch number of chips, the PN code has a Z epoch number of chips plus 1 chip, which is the exact relationship being sought. Note that this same relationship occurs $L_z$ (which is 3) times in this example at every $L_z$ number of Y epochs. The same relationship occurs 23 Y epochs later at chip 231 and 23 Y epochs after that at chip 392. Equation 2 finds the first relationship at chip 70, the $10^{th}$ Y epoch.

This scaling effect can also be seen in FIG. 4. It will be appreciated that the difference between FIG. 1 and FIG. 4 is that the X component code length of FIG. 4 is 2 chips, as compared to the 3 chip length of the X code in FIG. 1. It can be seen that the XY epochs and XZ epochs are separated by the identical number of X epochs in the two figures; the figures are scaled by the length of the X code.

NORMALIZED, EPOCH, AUTONOMOUS PHASE NUMBERS

Equation 2 identifies the $10^{th}$ XY epoch as the epoch at which an XZ and XY are separated by one X epoch, in that order of arrival, which is referred to as $N_{zy}$. An XY epoch is 21 chips long (the length of the X code times the length of the Y code, in this example). Therefore, 10 XY epochs is 210 chips in length. Now that the number of chips is known at which XZ and XY epochs have a phase relationship of one X epoch, the composite code phase position can be known where XZ and XY epochs are separated by n X epochs. As an example, an XZ epoch should precede an XY epoch by 2 X epochs at chips $2 \times 210 = 410$ in the example PN code of FIG. 1. It can be seen that the XY epoch at chip 420 is preceded 2 X epochs by an XZ epoch. An XZ epoch precedes an XY epoch by 22 X epochs at 22 $N_{xy}$ number of chips ($22 \times 210$ MOD $483 = 273$); the XZ epoch at chip 207 is 22 X epochs before the XY epoch at chip 273. $N_{xy}$ is normalized to 1 X-epoch separation of an XZ and XY epoch. Normalizing this relationship to a separation of 1 X epoch, the PN composite code phase at the XY epoch of any XZ to XY separation can be determined in accordance with features of the present invention.

It will be appreciated that XZ epochs have a phase of 1 (X epoch) at the NEAP epoch of the third component code; the third component code (Y) has zero phase at the $NEAP^{th}$ XY epoch; the NEAP number is not affected by a non-zero phase of the third component code.

Figure 5:
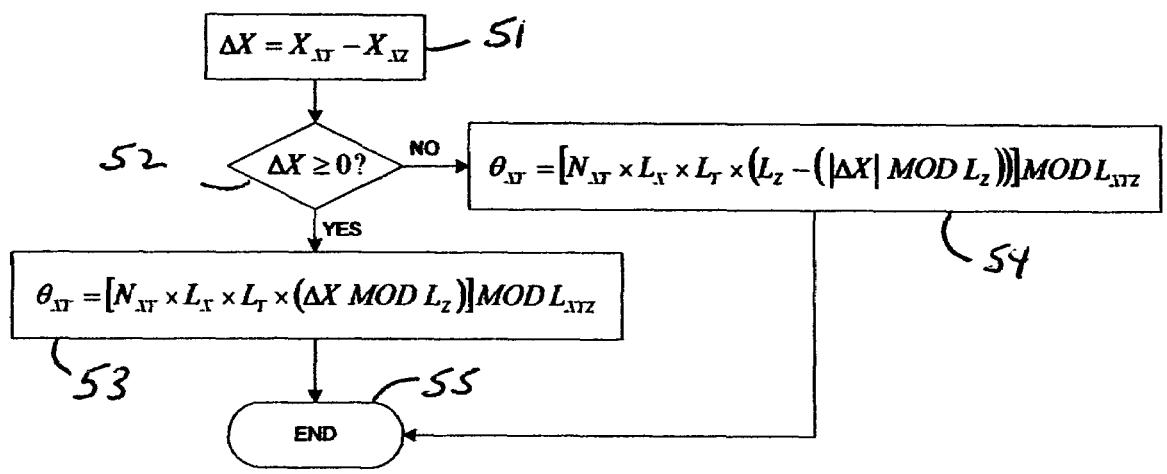
FIG. 5 is a flowchart illustrating one method to determine PN composite code phase at an XY epoch with DX separation in accordance with the present invention.

Referring to FIG. 5, there is shown a flow chart showing one method for determining the PN composite code phase of the XY epoch given any XY to XZ separation: it can be seen from FIG. 5 that PN composite code phase can be determined regardless of the order of XY and XZ epoch arrival. Further, XY and XZ epochs do not have to be contiguous. Referring also to FIG. 6A, NEAP counters and latches are depicted in the block diagram. The X-epoch counters 6A1 and 6A2, are latched on XY and XZ epochs, respectively. If the XY-latched X epoch is greater than the XZ-epoch latched X epoch, the XY epoch has occurred after the XZ epoch, and $\Delta X$ is positive.

A function of the X-epoch counters 6A1, 6A2 is to latch the X-epoch count at the most recent XY and XZ epochs. However, should an event occur that precludes the X-epoch latch at the most recent XY or XZ, subsequent XY or XZ epochs can latch the X-epoch counter to satisfy the NEAP feature of the present invention. It can be seen in the flowchart of FIG. 5 that $\Delta X$ modulo the length of the Z code is employed to keep the value of $\Delta X$ smaller than the length of the Z code in order to keep numbers as small as possible when calculations are made (steps 53 and 54). It should be noted that the XY/XZ-latched X-epoch counters 6A1, 6A2 are self-correcting; if a counting or latch error is made, the error is corrected at the next XY or XZ-latched X-epoch count because only the difference between the two latched values is important. When an error is introduced into each of the latched terms, the difference factors out the error.

Still referring to FIG. 5, when $\Delta X$ is positive, step 52, the PN composite code phase at the last-latched XY epoch is calculated as shown in FIG. 5, step 53 and Equation 3. Equations may be derived to calculate the PN composite code phase at the last-latched XZ epoch, but given that the length of the Y code is shorter than the length of the Z code, XY epochs are more numerous and occur more often than XZ epochs, and calculation of the PN composite code phase at the last-latched XY epoch is the preferred embodiment of the NEAP feature of the present invention. According to Equation 3, the PN composite code phase at the last-latched XY epoch is the NEAP XY epoch, calculated according to Equation 2, times the length of an XY epoch times the XZ/XY separation. This result, which may be a number of chips longer than the length of the PN code, modulo the length of the PN code (the length of the X code times the length of the Y code times the length of the Z code) provides a phase number of chips less than the length of the PN code.

$$\theta_{XY} = [N_{XY} \times L_X \times L_Y \times (\Delta X \ MOD \ L_Z)] MOD \ L_{XYZ} \quad \text{Equation 3}$$

If the last-latched epoch is an XZ epoch, $\Delta X$ is negative, and the PN composite code phase at the last-latched XY epoch is calculated according to step 54 and Equation 4. There is only a Z number of XY epochs in a PN code. Therefore, when $\Delta X$ is negative, its absolute value is subtracted from the length of the Z code, and the PN composite code phase is calculated as otherwise for the positive $\Delta X$ case.

$$\theta_{XY} = [N_{XY} \times L_X \times L_Y \times (L_Z - (|\Delta X| MOD \ L_Z))] MOD \ L_{XYZ} \quad \text{Equation 4}$$

Equations and flowcharts up to this point have reference N codes composed of three component codes. The methods and system presented in this document are not limited to PN codes composed of 3 component codes and can be applied to PN codes composed of any suitable number of PN component codes.

NEAP FEATURE OF THE PRESENT INVENTION CORRECTIVE ACTION

Figure 7:
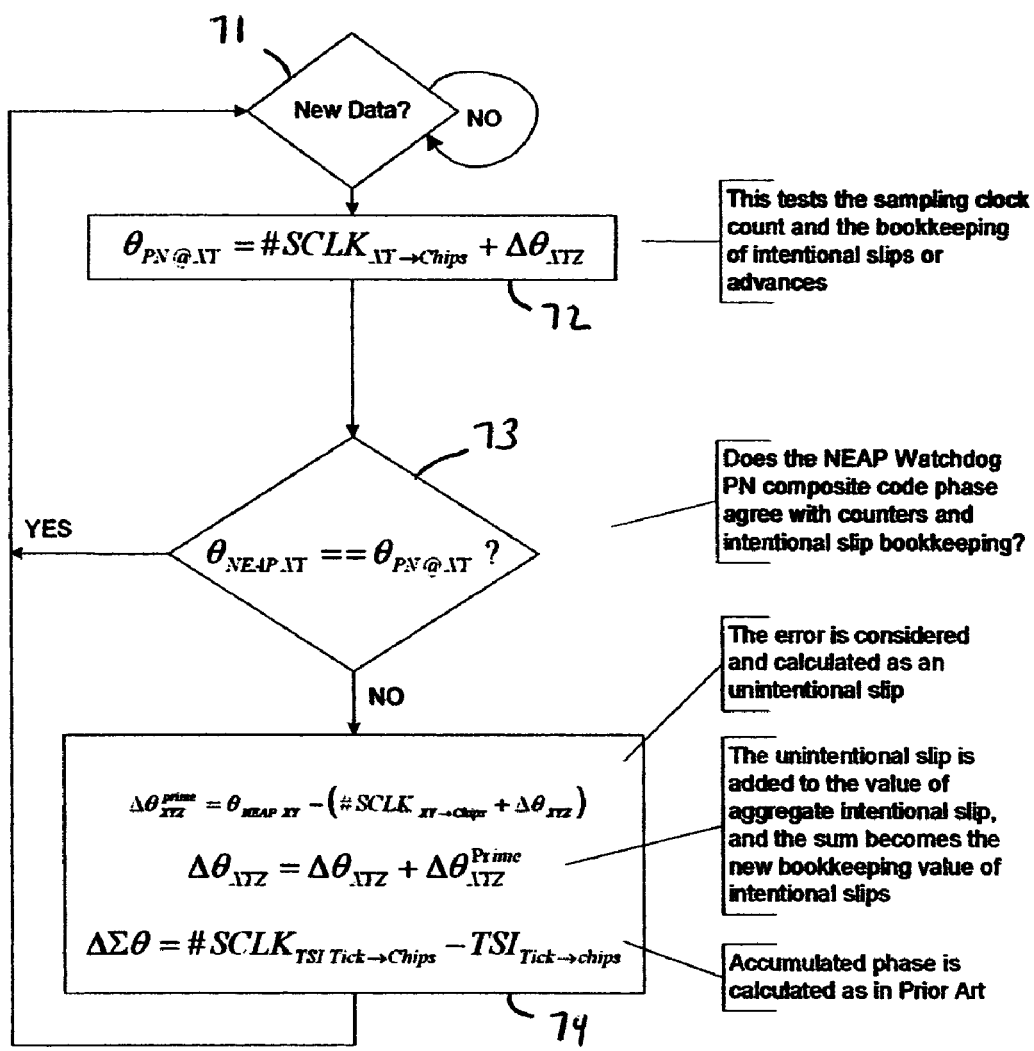
FIG. 7 is a flowchart illustrating one method for transparently correcting PN generator hardware error in accordance with the present invention.

Once the NEAP feature of the present invention has detected a PN composite code phase error, corrective action can be taken as shown in FIGS. 6B, and 7.

The assumed PN composite code phase at an XY epoch ($\theta_{PN@XY}$) is equal to the number of sampling clocks actually counted and latched at the XY epoch ($\#SCLK_{ZY \to Chips}$) plus the number of chips intentionally slipped or advanced ($\Delta\theta_{ZYZ}$), step 72. The smallest unit of a PN code is a chip, and the master (sampling) clock can equal the chipping rate, or it can be an integer multiple of the chipping rate.

Supporting data-aided PN code acquisition, the assumed PN composite code phase ($\theta_{PN \ @TSI \ tick}$) at the desired granularity of the Time Since Initialization counter (a counter that counts cycles of the master oscillator used as the master clock, which is shown as an example 10 MHz in FIG. 6B is equal to the value of the TSI counter at the precision of the desired granularity converted to chips ($TSI_{Tick \to chips}$) plus intentional PN code slips and advances ($\Delta\theta_{XYZ}$) plus accumulated phase ($\Delta\Sigma\theta$), which is the accumulated phase variation from the nominal chipping rate, the difference between the actual number of chips generated in a time period and that very time period measured by the master clock, converted into chips by an exact time-to-chip relationship). This relationship, PN composite code phase at a TSI tick, is expressed in Equation 5. The relationship between the sampling clock count latched by a TSI tick and the TSI counter is expressed in Equation 6.

$$\theta_{PN@TSI \ tick} = TSI_{tick \to chips} \Delta\theta_{XYZ} \Delta\Sigma\theta \quad \text{Equation 5}$$

$$\#SCLK_{TSI \ tick \to chips} = TSI_{tick \to chips} \Delta\Sigma\theta \quad \text{Equation 6}$$

If the TSI-tick-latched sampling clock counter 6B3 and the XY-epoch-latched sampling clock counter 6B2 are counting properly, the TSI-tick-latched counter 6B3 can be trusted to calculate accumulated phase by means of Equation 6. It is expected that PN phase errors will not originate from the counters 6B3, 6B2 and clock counter 6B1 shown in FIG. 6B. However, the counters can be verified by multiplexing the latches shown in FIG. 6 with a latch from a processor. The processor can latch both counters (6B2 and 6B3) and verify that they have the same count. If the TSI counter 6B1 has made a mistake, the correction will be made in the calculation of accumulated phase, $\Delta\Sigma\theta$, by means of Equation 6 (step 74). All other phase errors, determined by step 73, are corrected by means of an unintentional slip calculation, shown in FIG. 7, step 74, which is added to the value of the aggregate intentional slip, and the sum becomes the new bookkeeping value of intentional slips ($\Delta\theta_{XYZ}$). Advantageously, features of the present invention detect the phase error, if any, and makes required corrections, leaving the process transparent of the communication network.

It will be further appreciated that the invention described herein advantageously accomplishes PN composite code phase determined substantially precisely by XY and XZ epoch arrivals and relative (X-epoch) separation. The NEAP feature of the present invention operated independently of XY/XZ epoch contiguousness and order of arrival (see FIGS. 5 and 6A). Once a PN code phase error is detected, the needed correction is made, preserving the communication network from interruption in a manner that is transparent to the communication network.

It will be appreciated that the present invention advantageously provides a system and method where PN composite code phase can be known precisely by XY and XZ epoch arrivals, and relative (X-epoch) separation.

It should be understood that the foregoing description is only illustrative of the invention. Various alternatives and modifications can be devised by those skilled in the art without departing from the invention. For example, Equation 1 may be modified such that:

$$(N_{MXY} \times L_X \times L_Y) MOD(L_X \times L_Z) = L_X M \quad \text{Equation 7A}$$

Where M is an integer 1, 2, 3, . . .

It will be appreciated that once Nxy is determined in accordance with features of the present invention then all M * X-Epoch separations of XY and XZ epochs are known.

It will be further appreciated that any suitable method for combining component codes and generating local epoch symmetrical composite PN codes may be used. It will be further appreciated that in embodiments using more than three component codes; for example, four component codes; the component codes (X, Y, Z1, and Z2) may be MAND combined X⊕(Y•(Z1⊕Z2)), meaning X xor Y AND Z1 xor Z2, (where AND refers to AND-Boolean logic). IN the preferred embodiment, one of the PN codes to the left of the AND in the MAND code is assigned to be an even-length code with special auto correlation properties. In alternate embodiments, any of component codes could be assigned to be a suitable length with suitable autocorrelation properties. In addition, a MAND composite code composed of four component codes in accordance with the teachings of the invention has partial correlation properties with its X, Y, and/or or (Z1⊕Z2) component codes. For example, when a MAND code, where a MAND code is defined for a three component code which has been logically combined according to X xor (Y and Z), or a four component code has been logically combined according to X xor (Y and (Z1 xor Z2)), is mixed (or correlated) by the receiver with an exact copy of its X code, and the X code is aligned (in phase) with the MAND code, the MAND PN encoded data is recovered, albeit the recovered signal has ¼ the power than if full correlation were achieved. Thus, by acquiring, in accordance with the teachings of the invention, an even-length code first, symbol synchronization [of even or odd length]

can be achieved independent of symbol synchronizers, and a partial correlation allows the recovery of encoded or unencoded data from the received signal. It will be further appreciated that in 4-component code systems the components may be MAJ combined codes, where a MAJ combined code is defined for a three component code which has been logically combined according to (X and Y) xor (X and Z) xor (Y and Z). MAJ for a 4-component-code sequence:

$$X, Y, Z1, \text{ AND } Z2: MAJ = (X \cdot Y) \oplus (X \cdot Z1) \oplus (X \cdot Z2) \oplus (Y \cdot Z1) \oplus (Y \cdot Z2) \oplus (Z1 \cdot Z2)$$

It should be understood that the foregoing description is only illustrative of the invention. Thus, various alternatives and modifications can be devised by those skilled in the art without departing from the invention. For example, MOD combinatorial logic, e.g., $X \oplus Y \oplus Z$ or $X \oplus Y \oplus Z1 \oplus Z2$ may be used. Accordingly, the present invention is intended to embrace all such alternatives, modifications and variances that fall within the scope of the appended claims.

It will be further appreciated that the aforementioned IC may be an application specific IC (ASIC), or a function of firmware. A suitable programming language such as a Very High Speed Integrated Circuit (VHSIC) Hardware Description (VHDL) Language file may define the operation of the ICs or firmware.

What is claimed is:

1. A receiver for acquiring composite pseudo-noise (PN) encoded signals, the receiver comprising:
   a receiver demodulator wherein the receiver demodulator is adapted to generate a normalized epoch autonomous phase (NEAP), wherein the NEAP comprises the form:

$$(N_{XY} \times L_X \times L_Y) MOD(L_X \times L_Z) = L_X$$

wherein $N_{xy}$=integer number of $L_x L_y$ epochs of interests, and $L_{(PN...*PN...)}$=epoch length of PN component codes;
   a first receiver clock generator;
   at least three first receiver pseudo-noise (PN) component code generators coupled to the first receiver clock generator;
   a receiver logic combiner coupled to the at least three first receiver PN component code generators, the receiver logic combiner adapted to generate a local epoch symmetrical composite PN code, wherein the local epoch symmetrical composite PN code comprises at least three PN component codes; wherein the at least three PN component codes are relatively prime.

2. A receiver as in claim 1 wherein the at least three first receiver pseudo-noise (PN) component code generators comprise four first receiver PN component code generators.

3. A receiver as in claim 1 wherein the receiver demodulator is adapted to generate a normalized epoch autonomous phase (NEAP), wherein the NEAP comprises the form:

$$(N_{NXY} \times L_X \times L_Y) MOD(L_X \times L_Z) = L_X M$$

where $N_{xy}$=integer variable number of $L_x L_z$ epochs of interest, M=integer variable number of $L_x$ epochs, and $L_{(PN..*PN...)}$=epoch length of PN component codes.

4. A receiver as in claim 1 wherein the receiver demodulator is adapted to adjust a local epoch symmetrical composite PN code phase according to the NEAP.

5. A receiver as in claim 1 wherein the receiver logic combiner comprises a MAND logic combiner.

6. A receiver as in claim 1 wherein the receiver logic combiner comprises a MAJ logic combiner.

7. A method for determining Psuedo-Noise (PN) composite phase, the method comprising:
   providing at least three PN component codes, wherein the at least three PN component codes are relatively prime;
   partially correlating a received PN composite encoded signal with a first minor epoch;
   searching for phase alignment of the received PN composite encoded signal with a second minor epoch; and
   correlating the received PN composite encoded signal with a receiver PN composite code phase when the first minor epoch and the second minor epoch are separated by a predetermined phase wherein correlating the received PN composite encoded signal further comprises determining a normalized epoch autonomous phase associated with the first minor epoch and the second minor epoch.

8. A method as in claim 7 wherein generating the PN composite code from the PN component codes further comprises logically combining the plurality of PN codes according to MAND logic.

9. A method as in claim 7 wherein generating the PN composite code from the PN component codes further comprises logically combining the plurality of PN codes according to MAJ logic.

10. A method as in claim 7 wherein correlating the received PN composite encoded signal with the receiver PN composite code phase further comprises:
    searching for the normalized autonomous epoch phase substantially in steps of the first minor epoch;
    finding the normalized autonomous epoch phase; and
    determining composite phase resulting from finding the normalized autonomous epoch phase.

11. An integrated circuit (IC), wherein the IC comprises:
    at least three receiver pseudo-noise (PN) component code generators $PN_x$, $PN_y$, $PN_z$, wherein each PN component code generator is adapted to generate relatively prime PN component codes when compared with each of the other PN component code generators, wherein the at least three relatively prime PN component codes comprise at least:
    a first minor epoch;
    a second minor epoch; and
    a Normalized Epoch Autonomous Phase Number (NEAP) generator for generating at least one NEAP associated with the first minor epoch and the second minor epoch, wherein the NEAP generator comprises a NEAP look-up-table.

12. An IC as in claim 11, wherein the IC comprises an Application Specific IC (ASIC).

13. An IC as in claim 11 wherein the IC comprises a field programmable gate array (FPGA).

14. An IC as in claim 11 wherein the IC further comprises an X-epoch counter.

15. An IC as in claim 14 wherein the X-epoch counter further comprises:
    at least one XY-epoch latched counter; and
    at least one XZ-epoch latched counter.

16. An IC as in claim 11 wherein the IC further comprises:
    at least one sampling clock count input;
    at least one time-since-initialization (TSI) generator;
    at least one TSI_latched sampling clock counter coupled to the at least one TSI generator and the at least one sampling clock count input; and
    at least one XY_latched sampling clock counter coupled to the at least one sampling clock count input.

17. An IC as in claim 11 wherein the IC comprises an Application Specific IC (ASIC).

18. An IC as in claim 11 wherein the IC comprises a field programmable gate array (FPGA).

19. A program storage device readable by a machine, tangibly embodying a program of instructions executable by the machine to perform method steps for determining Psuedo-Noise (PN) composite phase, the method comprising:
  providing at least three PN component codes, wherein the at least three PN component codes are relatively prime;
  partially correlating a received PN composite encoded signal with a first minor epoch;
  searching for phase alignment of the received PN composite encoded signal with a second minor epoch; and
  correlating the received PN composite encoded signal with a receiver PN composite code phase when the first minor epoch and the second minor epoch are separated by a predetermined phase, wherein correlating the received PN composite encoded signal further comprises determining a normalized epoch autonomous phase associated with the first minor epoch and the second minor epoch.

20. A program storage device as in claim 19 wherein the program of instructions comprise at least one Very High Speed Integrated Circuit (VHSIC) Hardware Description (VHDL) Language file.

* * * * *